United States Patent [19]

Turner

[11] 3,900,408
[45] Aug. 19, 1975

[54] BEARING LINER
[75] Inventor: Peter H. Turner, Burbank, Calif.
[73] Assignee: Sargent Industries, Inc., Los Angeles, Calif.
[22] Filed: June 3, 1974
[21] Appl. No.: 475,622

Related U.S. Application Data
[63] Continuation of Ser. No. 274,606, July 24, 1972, abandoned.

[52] U.S. Cl. ............................. 252/12.6; 308/238
[51] Int. Cl. ............................................. F16c 9/06
[58] Field of Search ........ 308/72, 238, 342; 161/58, 161/59, 60, 164, 265, 92, 151, 167, 189, 152, 158, 270; 287/87

[56] References Cited
UNITED STATES PATENTS

| | | | |
|---|---|---|---|
| 3,231,460 | 1/1966 | Andrews | 308/238 |
| 3,421,969 | 1/1969 | Roode et al. | 161/189 |
| 3,471,207 | 10/1969 | McCloskey | 308/238 |
| 3,594,049 | 7/1971 | Turner | 308/72 |

Primary Examiner—George F. Lesmes
Assistant Examiner—James J. Bell
Attorney, Agent, or Firm—Ellsworth R. Roston

[57] ABSTRACT

To provide support for a rotatable shaft, a bearing ball is fixed to the shaft and rotatably mounted within a bearing race. A low friction liner which is disposed between the wearing surfaces of the ball and the race includes a backing, which can be adhered to the wearing surface of the bearing race, and a layer of low friction material, which can be disposed to contact the bearing and thereby provide permanent lubrication between the bearing and the race. The backing can be paper impregnated with chopped, compressed fibers such as wood or rice to provide the liner with a substantially linear stress-strain characteristic similar to that of metals. The paper backing reduces the deflection of the liner in response to compressive stresses so that the accuracy of movement of the bearing within the race is increased significantly. The layer of low friction material may be formed from an intimate mixture of an adhesive and small particles of a low friction material.

23 Claims, 4 Drawing Figures

PATENTED AUG 19 1975 3,900,408

BEARING LINER

This is a continuation of application Ser. No. 274,606, filed July 24, 1972 now abandoned.

BACKGROUND OF THE INVENTION

1. Field of the Invention

This invention relates generally to low friction liners for reducing the friction between wearing surfaces, and more specifically to bearing liners for use between bearing balls and bearing races.

2. Description of the Prior Art

Bearing liners have been disposed between bearings and bearing races to reduce the friction forces created by their wearing surfaces. One of the most recent advances in the bearing liner art is the disclosure by Peter H. Turner in U.S. Pat. No. 3,594,049, of a backing member coated on one side with a layer of adhesive and coated on the opposite side with an intimate mixture of adhesive and small particles of a low friction material. The adhesive layer provides a means for bonding the backing member to one of the wearing surfaces, and the low friction layer provides a means for permanently lubricating the wearing surfaces. In U.S. Pat. No. 3,594,049, the backing member is disclosed in one embodiment to comprise a woven sheet formed from dacron or nylon strands. Such a bearing liner provides a significant advance over the prior art especially with respect to its reduced thickness and the considerably increased duration of its useful life.

SUMMARY OF THE INVENTION

The present invention includes a backing member having an adhesive layer on one side thereof and an intimate mixture of an adhesive and a low friction material on the opposite side thereof. The backing member can be an unwoven material impregnated with randomly disposed compressed fibers such as vegetable fibers to provide the bearing liners with stress-strain characteristics which are substantially linear regardless of the compressive stress imposed upon the backing member. The deflection of the improved liners in response to a particular value of compression is accordingly minimized. This characteristic is particularly advantageous in improving the accuracy of movement of the bearings within the bearing liners.

The surfaces of the backing member can be calendered or smoothed to harden the backing member and to enable the layer including the low friction material to be fabricated with a substantially constant thickness. A low friction layer with a substantially constant thickness will have a longer useful life since there will be no thin spots to wear through and end prematurely the life of the liner.

The backing member also can comprise a laminate including layers of fiber-impregnated material wherein the fibers in each layer are aligned substantially perpendicular to those in adjacent layers. The resulting bearing liners have a modulus of elasticity which is similar to that of metals. The improved liners have characteristics including high tensile strength and compressive rigidity to extend their useful life and improve the accuracy of movement of the bearing balls within their races.

DESCRIPTION OF PREFERRED EMBODIMENTS

Figure 1:
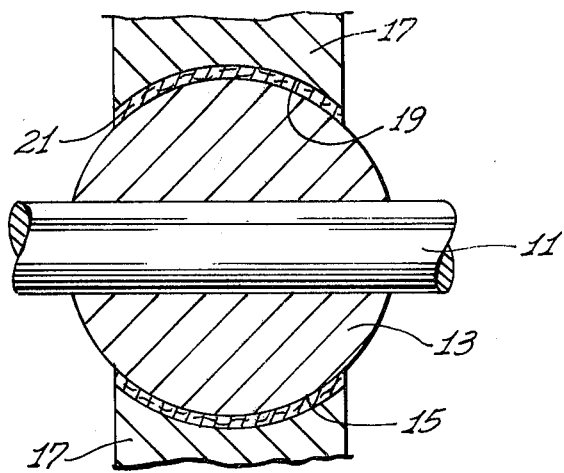
FIG. 1 is a side elevational view partially in section of a shaft supported by a bearing ball and a bearing race with a bearing liner disposed between the ball and the race.

Referring to the drawings and in particular to FIG. 1 thereof, reference numeral 11 designates a rotatable shaft on which is mounted a bearing ball 13 having an outer or wearing surface 15. A bearing race 17 having an inner or wearing surface 19 can be centered upon the ball 13 to provide support for the shaft 11. A bearing liner 21 is preferably disposed between the wearing surface 19 of the race 17 and the wearing surface 15 of the ball 13. Thus disposed the bearing liner 21 can provide a means for permanently lubricating the bearing 13 and the race 17 so that there is less resistance to relative movement therebetween and a reduction in the deterioration of the wearing surfaces 15 and 19.

Figure 2:
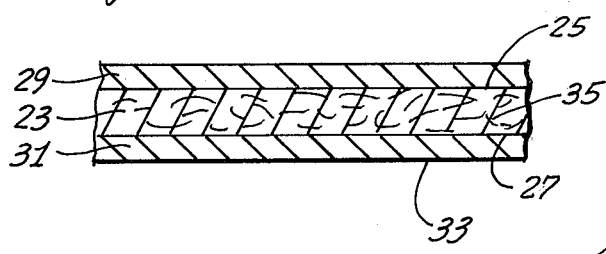
FIG. 2 is a side elevational view in cross section of one embodiment of the bearing liner.

A cross-section view of one embodiment of the bearing liner 21 is shown in FIG. 2. The reference numeral 23 designates a backing such as paper having first and second oppositely facing major surfaces 25 and 27, respectively. An adhesive layer 29 can be disposed upon the first major surface 25 of the backing 23, and a low friction layer 31 can be disposed upon the second major surface 27. The low friction layer 31 is partially defined by a wearing surface 33.

In the preferred embodiment the backing 23 is adhered to the wearing surface 19 of the race 17 by the adhesive layer 29. Thus disposed the liner 21 has a fixed relationship with the bearing race 17, and the wearing surface 33 of the low friction layer 31 slidably engages the wearing surface 15 of the ball 13. It can be appreciated by those skilled in the art that the bearing liner 21 may be adhered to the ball 13 in which case the wearing surface 33 would be in contact with the wearing surface 19.

The adhesive comprising the adhesive layer 29 can be any of those adhesives disclosed by Peter H. Turner in U.S. Pat. No. 3,594,049 and assigned of record to the assignee of record of the present application. One such adhesive is Rabond R-84015 produced by Raybestos-Manhattan of Bridgeport, Connecticut.

The low friction layer 31 can comprise a similar adhesive filled with a 5-micron polytetrafluoroethylene powder manufactured by DuPont. The adhesive and the powder can be intimately mixed in the proportions disclosed in U.S. Pat. No. 3,594,049; however, lower ratios of powder to adhesive are preferred since the compressed fibers in the backing have a tendency to absorb some of the adhesive from the wear coating mixture. For example, the low friction powder may have a range of approximately 20 percent to 35 percent by weight with the remainder being adhesive. In the preferred embodiment the low friction layer contains 20 percent by weight of polytetrafluoroethylene powder. The low friction layer may have a thickness of approximately 0.003 inch beyond the peaks of the backing layer 23. Preferably this dimension is no greater than approximately 0.0035 inch.

The backing 23 can comprise a fibrous material such as paper having fibers such as those shown generally at 35. In one of the embodiments the fibers 35 are chopped and randomly disposed within the backing 23. The fibers 35 are preferably compressed since a minimum porosity is desirable to augment the adhesion of the adhesive and low friction layers 29 and 31, respectively, to the backing 23. It should be understood that the randonly disposed fibers 35 can comprise any fiber although the compressed vegetable fibers commonly available in the form of paper are particularly advantageous and economically desirable. Calendered paper and rice paper contain fibers which are some of the most compressed and therefore provide excellent deflection characteristics.

Since the backing 23 is a fibrous material, the particles of powder can be retained between the fibers to provide a mechanical bond between the fibers and the particles of low friction material. This is particularly desirable since the particles are quite small. A chemical bond also can be produced between the adhesive and the particles of low friction material. Furthermore, by compressing the backing 23, the thickness of the backing is maintained substantially constant so that the thickness of the layer 31 of the adhesive and the low friction material will be substantially constant. This will insure that there will be no thin spots in the low friction layer to wear prematurely and end the useful life of the liner 21.

The layer 31 has all of the advantages disclosed in U.S. Pat. No. 3,594,049. For example, it has a long life. This results in part from the thin dimensions of the layer 31 and in part from the combination of the mechanical and chemical bonding of the particles of low friction material. It also results in part from the small size of the particles of low friction material. All of these advantages tend to prevent the low friction material from forming into a continuous smear on the exposed surface of the layer 31.

Figure 3:
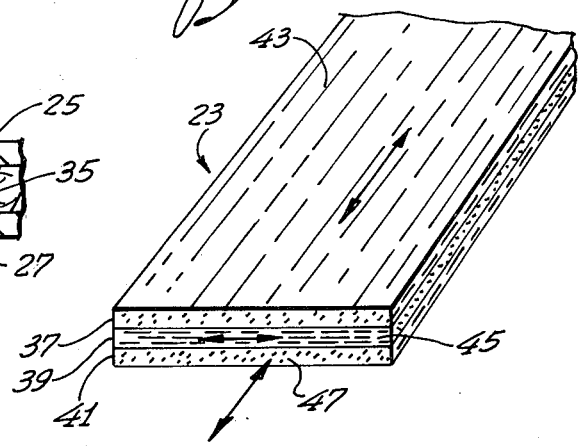
FIG. 3 is a perspective view of a further embodiment of the bearing liner.

A further embodiment of the backing 23 is shown in FIG. 3. In this backing a plurality of layers such as layers 37, 39, and 41, are adhered to each other to form a laminate. Each of the layers 37, 39, and 41 includes fibers 43, 45, and 47, respectively, oriented in a single direction so that the tensile strength of the layer is increased in that direction. In the preferred embodiment each layer, such as the layer 39, is disposed with respect to the layers on either side thereof, such as the layers 37 and 41, so that its fibers are substantiallly normal to the fibers in the adjacent layers. It follows that the direction of orientation of the fibers 43 and 47 in the layers 37 and 41, respectively, may be substantially parallel. The laminate shown in FIG. 3 provides the backing 23 with increased tensile strength and substantially uniform stress properties. This increased strength can be advantageous in those applications wherein a higher degree of liner reinforcement is desirable.

It is apparent that the bearing liners 21 will be subjected to compressive forces as the shaft 11 and the ball 13 rotate. It can be appreciated that any deflection of the bearing liners in response to these compressive forces will increase the wear on the engaging surfaces and reduce the accuracy of the shaft rotation. Bearing liners including woven materials, such as dacron, as disclosed in U.S. Pat. No. 3,594,049, have represented a significant advance over the prior art. As satisfactory as the bearing liners disclosed in U.S. Pat. No. 3,594,049 have been found to be, it is always desirable to provide bearing liners with enhanced characteristics such as enhanced deflection characteristics.

Figure 4:
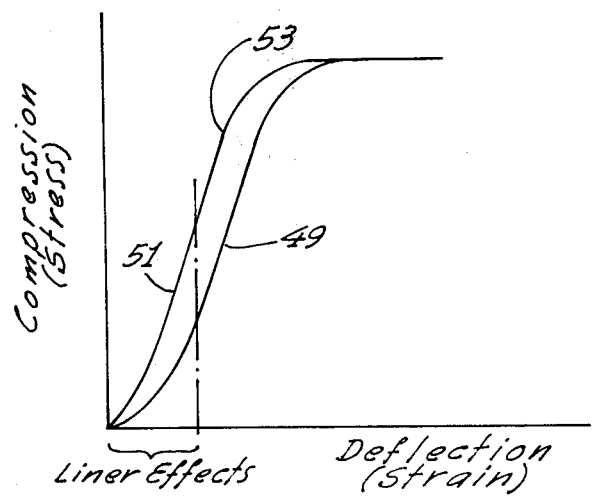
FIG. 4 illustrates curves representing bearing liner compression versus bearing liner deflection for the bearing liners of the prior art and the improved bearing liners.

The stress-strain curve shown in FIG. 4 and designated by the reference numeral 49 is characteristic for the bearing liners disclosed in U.S. Pat. No. 3,594,049. For comparison, a stress-strain curve 51 characteristic of the improved liners 21 is also shown in FIG. 4. The curve 51 has a yield point 53 beyond which the liner will deflect with progressively decreased increments in load. It will be noted that the deflection is substantially linear in the regions of compressive force below the yield point 53, where the effects of the bearing liner 21 are most significant. It is apparent also that, for a given compressive force, the deflection is less in the liners 21 comprising the compressed fiber backing 23 than in the liners comprising the backings of the prior art. In fact, the backing 23 provides the liner 21 with a modulus of elasticity which is similar to that for metals in that the stress-strain curve 51 is substantially linear for values of compression less than that at the yield point 53.

It can be seen that the bearing liners 21 including the improved backing 23 have particularly advantageous properties for reducing the coefficient of friction between the wearing surfaces 15 and 19 without significantly reducing the compressive strength of the material supporting the ball 13. Thus, the bearing liner 21 provides a means for permanently lubricating the ball 13 without sacrificing the accuracy of movement and stability of the shaft 11. This accuracy of movement can have particular significance in systems which incorporate servomechanisms for amplifying mechanical movement. It is apparent that, in these systems, even a slight deflection of the shaft 11 can be amplified to ultimately produce a substantial error in movement. Thus, the low deflection characteristics of the backing 23 significantly decrease the error associated with these systems. Furthermore, the resulting bearing liners 21 also have increased rigidity and improved wear life characteristics.

While the present invention has been shown and described in what are conceived to be the most practical and preferred embodiments, it is recognized that departures may be made therefrom within the scope of the invention, which is therefore not to be limited to the details disclosed herein.

I claim:

1. A liner for reducing the coefficient of friction between first and second surfaces movable relative to each other, comprising:

a fibrous backing having first and second major surfaces and having chopped and compressed fibers to reinforce the liner;

an adhesive layer in fixed relationship with the first major surface of the backing for bonding the backing to the first surface; and a low friction layer in fixed relationship with the second major surface of the backing and providing a low friction surface for slidably engaging the second surface, the low friction layer having a thin dimension relative to the second major surface and being formed from small portions of low friction material interspersed in an adhesive; whereby the second and low friction surfaces have a lower coefficient of friction than the first and second surfaces.

2. The low friction linear as defined in claim 1 wherein the compressed fibers are randomly disposed in the backing.

3. The low friction liner as defined in claim 1 wherein the low friction layer comprises an intimate mixture of an adhesive and a powder of a low friction material.

4. The low friction liner recited in claim 1 wherein the fibrous backing comprises paper and the compressed fibers are vegetable fibers.

5. The low friction liner as defined in claim 1 wherein the fibrous paper backing is calendered to harden the surfaces of the backing.

6. The low friction layer as defined in claim 1 wherein the fibrous backing is a laminate comprising:
a first layer of fibers generally oriented to provide a relatively high tensile strength in a first direction, and
at least a second layer of fibers similar to the first layer and disposed in surface contact therewith and generally oriented in a second direction transverse to the first direction; whereby
the laminated backing provides the liner with properties including a high tensile strength and substantially improved stress properties.

7. A bearing liner for use between a first surface and a second surface for reducing the friction between the first and second surfaces during relative movement between the first and second surfaces, comprising:
first means constituting a fibrous material and having first and second major surfaces for reinforcing the liner, the first means having characteristics providing a deflection in response to a given compressive force;
second means for adhering the first major surface of the first means to the second surface; and
third means constituting particles of a low friction material in a mechanically bonded relationship with the fibrous material constituting the first means and providing a low friction layer between the first means and the first surface, the third means including an adhesive.

8. The bearing liner as defined in claim 7, wherein fibers are disposed at random within the fibrous material.

9. The bearing liner as defined in claim 8 wherein the third means includes an intimate mixture of an adhesive and the particles of the low friction material constitute a powder.

10. The bearing liner as recited in claim 9 wherein the fiber is a vegetable fiber and the deflection of the liner is substantialy directly proportional to the applied compressive force.

11. The bearing liner as defined in claim 10 wherein the vegetable fibers are compressed.

12. The bearing liner as defined in claim 10 wherein the vegetable fibers includes rice.

13. The bearing liner as defined in claim 9 wherein the first means is formed from at least a pair of laminations and wherein the fibers are oriented in a first one of the laminations to provide a relatively high tensile strength in a first direction and wherein the fibers are oriented in a second one of the laminations to provide a relatively high tensile strength in a second direction transverse to the first direction.

14. The liner set forth in claim 1 wherein the low friction layer extends above the second major surface by a dimension no greater than approximately 0.0035 inches.

15. The liner set forth in claim 1 wherein the particles of low friction material have a thickness no greater than 5 microns and wherein the particles of low friction material are retained between the fibers of the fibrous backing.

16. The liner set forth in claim 15 wherein the particles of low friction material constitute a polytetrafluoroethylene and wherein the polytetrafluoroethylene constitutes approximately 20 percent to 35 percent of the low friction layer by weight with the remainder constituting the adhesive.

17. The liner set forth in claim 16 wherein the adhesive in the adhesive layer and the adhesive in the low friction layer are the same and wherein the low friction layer extends above the second major surface by a distance no greater than approximately 0.0035 inches.

18. A bearing liner as set forth in claiam 8 wherein the fibers in the fibrous material are compressed.

19. A bearing liner as set forth in claim 18 wherein the third means constitutes an intimate mixture of an adhesive and the particles of the low friction material and wherein the low friction material constitutes a polytetrafluoroethylene.

20. The bearing liner set forth in claim 7, wherein the first means includes fibers disposed within the fibrous material and wherein the first means provides a relatively small amount of deflection when subjected to different compressive forces and further provides substantially a linear relationship between progressive amounts of progressive forces imposed upon the first means and the deflection produced in the first means by such progressive forces.

21. The bearing liner set forth in claim 20 wherein the first means comprises a pair of attached laminations each formed from a fibrous material with one of the layers having fibers disposed in a first orientation and the other layer having fibers disposed in a second orientation different from the first orientation.

22. The bearing liner set forth in claim 1 wherein the fibrous backing is disposed in layers and wherein the compressed fibers have a first orientation in one of the layers and have in a second one of the layers a second orientation different from the first orientation.

23. The bearing liner set forth in claim 7 wherein the first means constitutes at least a pair of layers of the fibrous material and wherein fibers are disposed in a first orientation in one of the layers and wherein fibers are disposed in a second one of the layers in a second orientation different from the first orientation.

* * * * *